United States Patent [19]
Kearney et al.

[11] Patent Number: 5,938,920
[45] Date of Patent: Aug. 17, 1999

[54] FILTER PLATE ASSEMBLY FOR HORIZONTAL-TYPE FILTER PRESS

[75] Inventors: William P. Kearney, Kingston; George T. Quigley, Cottekill; Sytze Albert Keuning, Saugerties, all of N.Y.

[73] Assignee: Stavo Industries, Inc., Kingston, N.Y.

[21] Appl. No.: 08/897,508

[22] Filed: Jul. 21, 1997

[51] Int. Cl.$^6$ ................................................. B01D 25/12
[52] U.S. Cl. .................... 210/228; 210/230; 210/231; 210/488; 210/499; 100/199
[58] Field of Search .................. 210/224, 227, 210/228, 230, 231, 488, 499; 100/195, 196, 197, 198, 199

[56] References Cited

U.S. PATENT DOCUMENTS

| | | |
|---|---|---|
| 842,484 | 1/1907 | Merril . |
| 1,852,371 | 4/1932 | Raymond et al. . |
| 1,860,937 | 5/1932 | McCaskell . |
| 3,272,296 | 9/1966 | Fredholm . |
| 3,347,383 | 10/1967 | Augerot ................................. 100/198 |
| 4,081,380 | 3/1978 | Johnson . |
| 4,392,956 | 7/1983 | Vogel . |
| 4,737,285 | 4/1988 | Krulitsch et al. . |
| 5,242,583 | 9/1993 | Thomas .................................. 210/232 |
| 5,366,627 | 11/1994 | Kearney et al. . |

FOREIGN PATENT DOCUMENTS 3814397  11/1989  Germany .

*Primary Examiner*—David A. Reifsnyder
*Attorney, Agent, or Firm*—Jacobson, Price, Holman & Stern, PLLC

[57] ABSTRACT

A self supporting filter plate assembly having two opposed screen sections with inwardly shaped deformations which engage each other to maintain a planar surface of the screen sections at a predetermined spacing. The screen sections releasably engage each other. Inwardly directed retaining pins of an exterior frame removably support the screen sections in place within the frame. Each of the screen sections include edges which are bent at 90° with respect to a central planar portion of each screen. The edge portions of the two screen sections interengage with each other by a projection in an inner surface of an edge portion of one screen section engaging with a recess extending from an outer surface of an edge portion of the other screen section. In addition, spaced openings in the edge portions, on opposed side edges of both screen sections, interengage with the inwardly directed retaining pins extending from an inner surface of opposed sides of the frame. Each of the screen sections also include a plurality of spaced dimples having a diameter of approximately one inch and a depth of approximately 5/16 of an inch. The dimples of each screen section are positioned opposite to one another so that upon assembly of the two screen sections within the frame, the dimples contact each other when the screen sections are forced into contact with one another by the closing operation of the filter press.

17 Claims, 5 Drawing Sheets

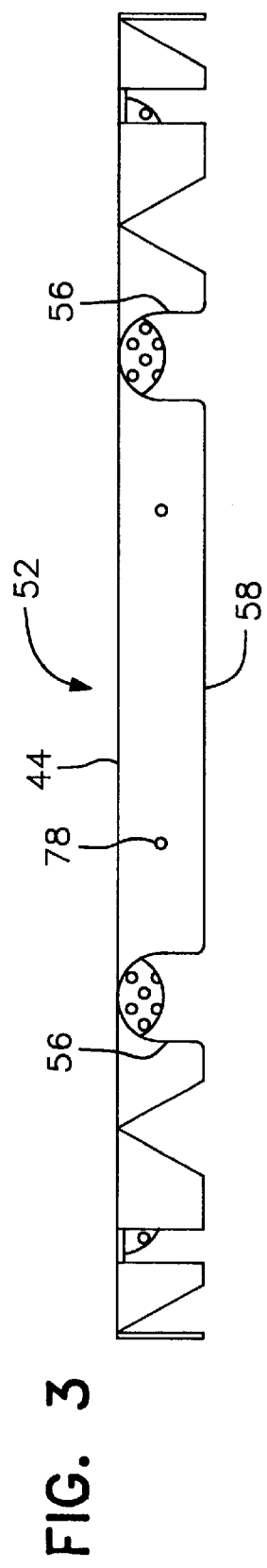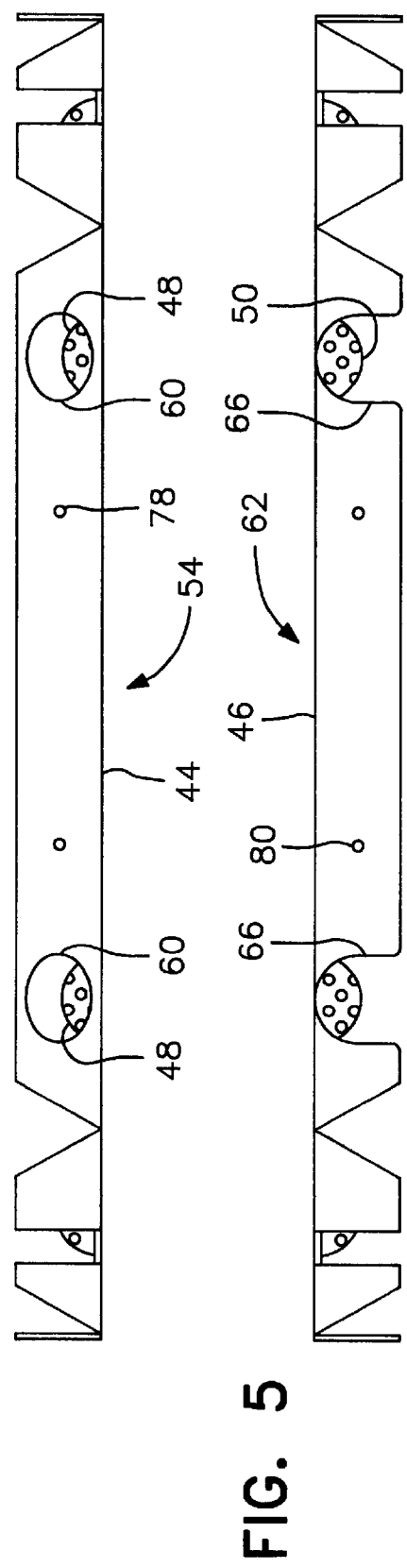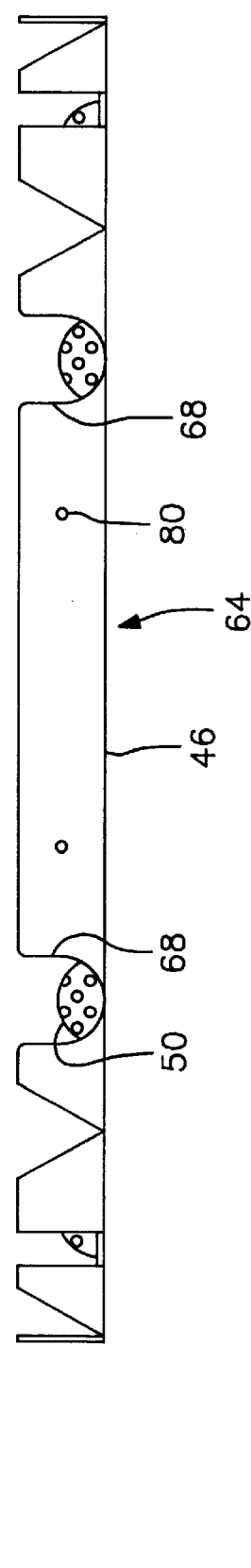
FIG. 3  FIG. 4  FIG. 5  FIG. 6

FILTER PLATE ASSEMBLY FOR HORIZONTAL-TYPE FILTER PRESS

FIELD OF THE INVENTION

The present invention relates to a filter plate assembly for a horizontal-type filter press. The filter press assembly includes a frame and two interconnecting plate screens which fit together within the frame. The plate screens cooperate with each other to maintain their position in the frame during a filter press operation.

BACKGROUND OF THE INVENTION

A horizontal-type filter press is known, for example, from U.S. Pat. No. 4,737,285 to Krulitsch et al, herein incorporated in its entirety by reference. In this patent, a horizontal-type filter press is disclosed which includes a plurality of filter elements supported on cross beams between a head and press cover. Filter aids disposed between the filter elements are moved by the filter press closing mechanism to seal the press edges located at each of the filter elements.

Filter presses of this type are known for clarifying filtration, sterilizing filtration, or residue filtration of liquids. These types of filter presses are used in the chemical industry, pharmaceutical industry, beverage industries and other industrial applications.

In a particular type of press, filtration must take place in a sealed system. Such a filter press is disclosed in U.S. Pat. No. 5,366,627, assigned to Stavo Industries, Inc., the assignee of the present application, and herein incorporated in its entirety by reference.

In these known filter presses, the filter elements have frames which may include opposed continuously flat sections of screening secured on opposite sides of a woven wire mesh support. Alternatively, the continuously flat screen sections may be secured on opposite sides of a plurality of parallel rods extending between opposite sides of the frame.

In one embodiment, a post would extend perpendicular to the plane of the screen sections and through both screen sections. A C-clamp secures one end of the post outside of the screen sections.

In the known embodiments, either by a welding of screen sections to a support or mechanical connections between opposed screen sections, a variety of grooves, nooks, crannies and other assorted crevices are formed within which contaminants may become trapped. In the use of filter presses in the pharmaceutical and other industries, it is essential that sterilization of the component parts of the filter press be possible. Accordingly, all surfaces must be accessible and free from surface defects or formations which can harbor contaminants.

Accordingly, there is a need for a filter plate assembly having readily disassembable components for proper sterilization and elimination of contaminants.

SUMMARY OF THE INVENTION

Accordingly, it is an object of the present invention to provide a self supporting filter plate assembly having two opposed screen sections with inwardly shaped deformations which engage each other to maintain a planar surface of the screen sections at a predetermined spacing. The screen sections releasably engage each other. Inwardly directed retaining pins of an exterior frame removably support the screen sections in place within the frame.

Each of the screen sections include edges which are bent at 90° with respect to a central planar portion of each screen. The edge portions of the two screen sections interengage with each other by a projection in an inner surface of an edge portion of one screen section engaging with a recess extending from an outer surface of an edge portion of the other screen section. In addition, spaced openings in the edge portions, on opposed side edges of both screen sections, interengage with the inwardly directed retaining pins extending from an inner surface of opposed sides of the frame.

Each of the screen sections also include a plurality of spaced dimples having a diameter of approximately one inch and a depth of approximately 5/16 of an inch. The dimples of each screen section are positioned opposite to one another so that upon assembly of the two screen sections within the frame, the dimples contact each other when the screen sections are forced into contact with one another by the closing of the filter press. The contacting of the opposed inwardly directing dimples, causes the exterior planar surface of each screen section to maintain its position without the need for welding or additional mechanical interconnections. It is understood as being within the scope of the present invention that the size and shape of the dimples is such that they project from one planar surface of one screen section to engage with dimples projecting from the planar surface of an opposed screen section so as to maintain the position of the planar surfaces of the screen sections upon contact of opposed dimples by closure of the filter press.

By the easy engagement and release of opposed screen sections of the present invention in a filter press frame, it is easy to totally clean and sterilize all portions of the screen sections and frame so as to avoid retention of contaminants. In this manner, assurances of freedom from contamination can be made. Accordingly, the filter plate assembly of the present invention can be used for pharmaceutical purposes, as well as other purposes from which freedom from contamination is required.

The screen sections are preferably made of 316 L (low carbon) stainless steel sheet of a 16 gauge thickness. All surfaces have a 180 grit finish and are electro-polished. The overall height of one screen section is 5/8 of an inch whereas the other screen section has an overall height of 1/2 of an inch so that the smaller height screen section fits within the larger height screen section so as to maintain an overall combined thickness of 5/8 of an inch when the two screen sections are assembled together.

It is therefore another object of the present invention to provide a filter plate assembly which is easily cleaned of contaminants.

It is another object of the present invention to provide a filter plate assembly made up of a frame and two screen sections removably mounted in the frame by way of the two screen sections interengaging with each other and being supported in position in the frame by retaining pins projecting into an opening of the frame.

It is still yet another object of the present invention to provide a filter plate assembly having two screen sections removably mounted in a frame on retaining pins extending from opposite sides of the frame to interengage with openings and recesses on opposed edges of the screen sections and with the screen sections interengaging with each other to be supported in the frame.

These and other objects of the invention, as well as many of the intended advantages thereof, will become more readily apparent when reference is made to the following description taken in conjunction with the accompanying drawings.

BRIEF DESCRIPTION OF THE DRAWINGS

FIGS. 3 and 4 illustrate opposite side edges of one screen section.

FIGS. 5 and 6 illustrate opposite side edges of the other screen section.

DETAILED DESCRIPTION OF THE PREFERRED EMBODIMENTS

Figure 1:
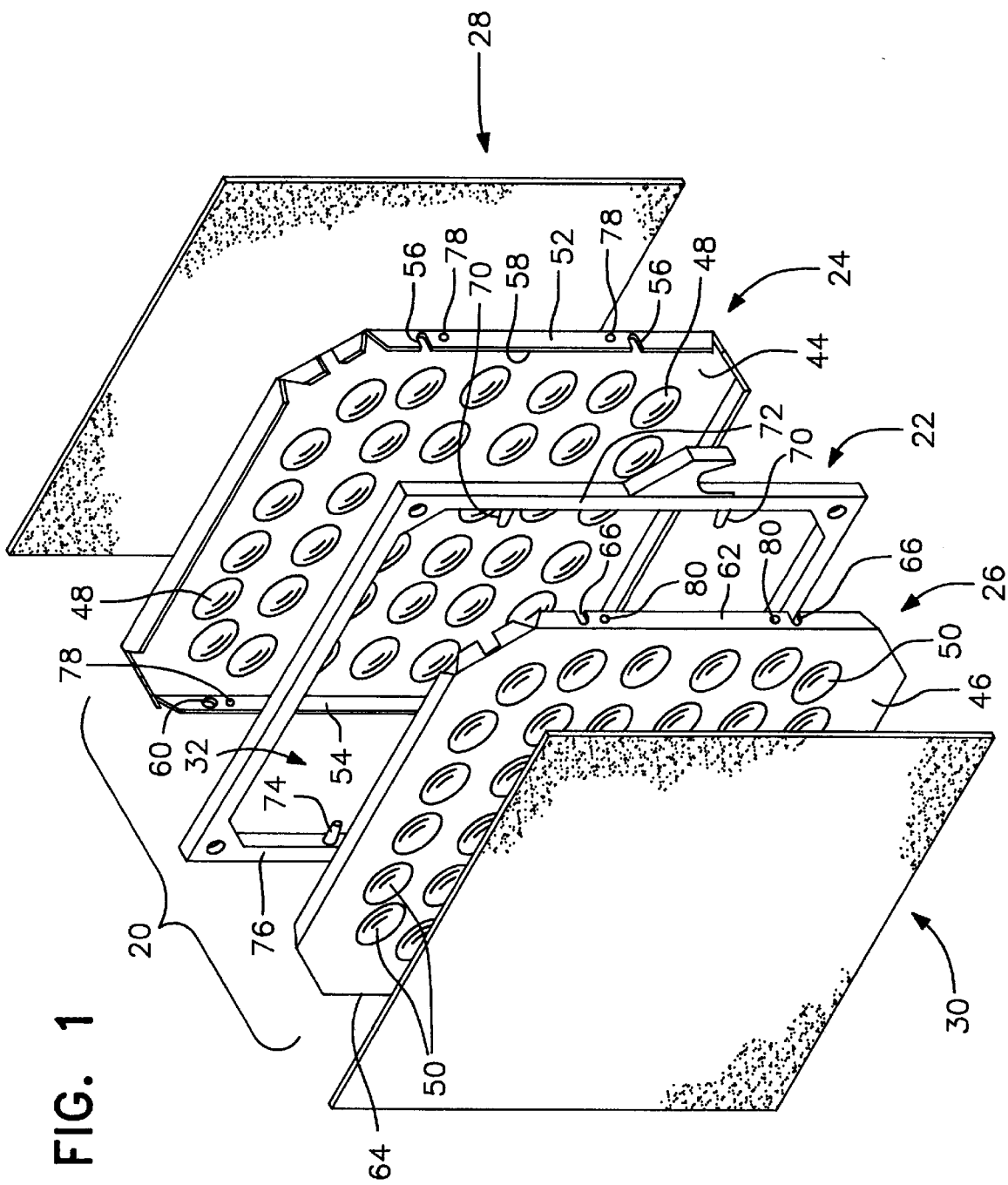
FIG. 1 is an exploded view of a filter plate assembly of the present invention including a frame and two screen sections and including two layers of filter material to be placed on opposite sides of the filter plate assembly in a filter press.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

With reference to the drawings, in general, and to FIGS. 1 through 6, in particular, a filter plate assembly embodying the teachings of the subject invention is generally designated as 20. With reference to its orientation in FIG. 1, the filter plate assembly includes a filter press frame 22 and two screen sections 24, 26.

In FIG. 1, filter material sections 28 and 30 are shown for illustrative purposes. The filter material sections are normally located on opposite sides of a filter plate assembly in a horizontal-type filter press.

Screen section 24, except for its truncated corners, has an overall square shape. The overall length and width of this screen section is approximately 14⅞ inches. The overall height of this screen section is ⅝ of an inch.

Similarly, screen section 26 is of an overall square shape, except for its truncated corners, having a length and a width of 14¹¹⁄₁₆ inches. In addition, the height of screen section 26 is approximately ½ inch.

Figure 2:
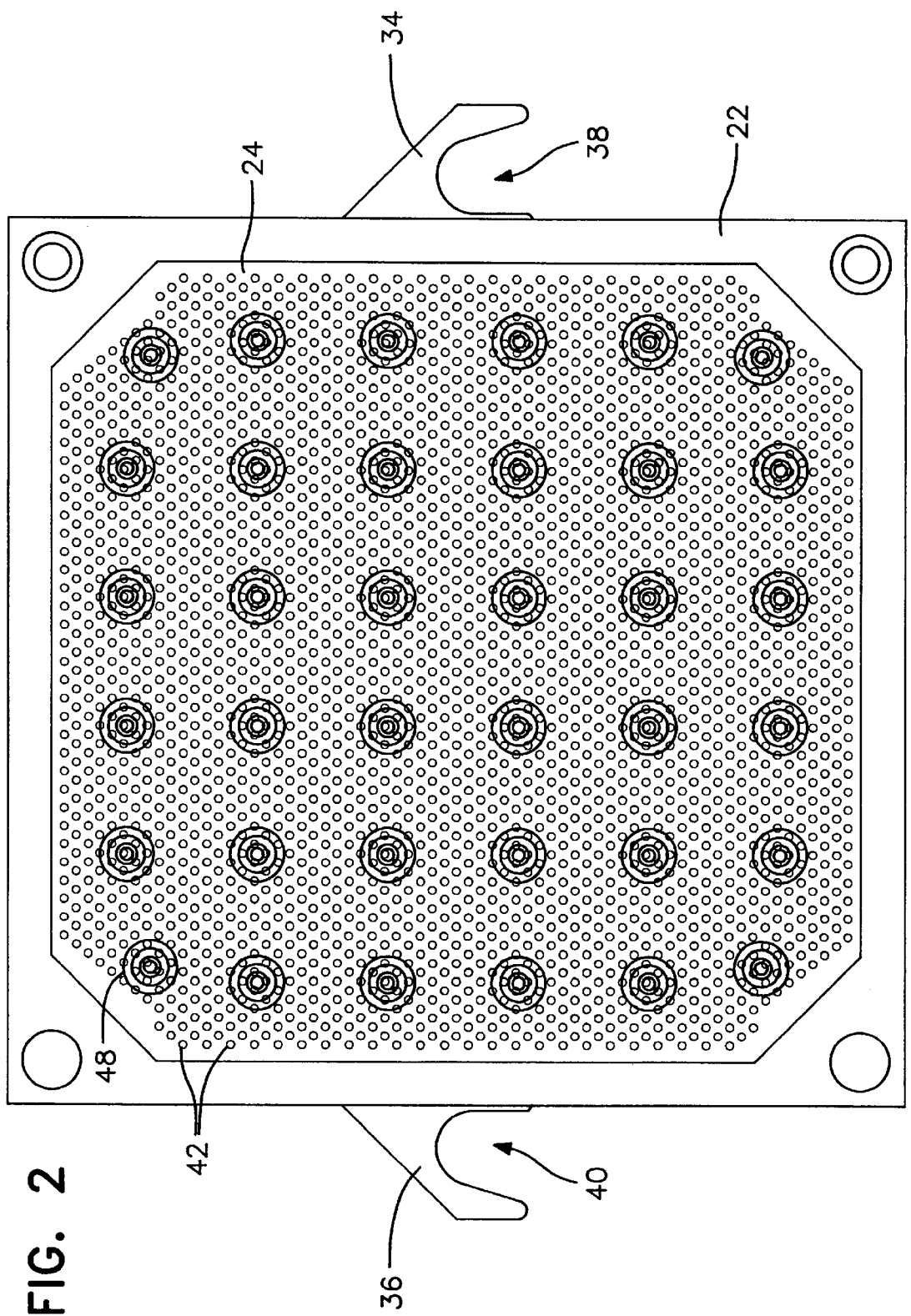
FIG. 2 is a detailed view of one side of a filter plate assembly illustrating a screen section located within the frame.

The dimensions of the two screen sections are such that screen section 26 can fit within screen section 24 and both screen sections can be removably secured in place within frame 22. As shown in FIG. 2, screen section 24 is mounted in frame 22, it being understood that screen section 26 is removably engaged with screen section 24 and also fitted within opening 32 of frame 22. As is known, frame 22 includes arms 34 and 36, having recesses 38, 40, which are adapted to slidably sit on cross beams of a horizontal-type filter press.

Figure 7:
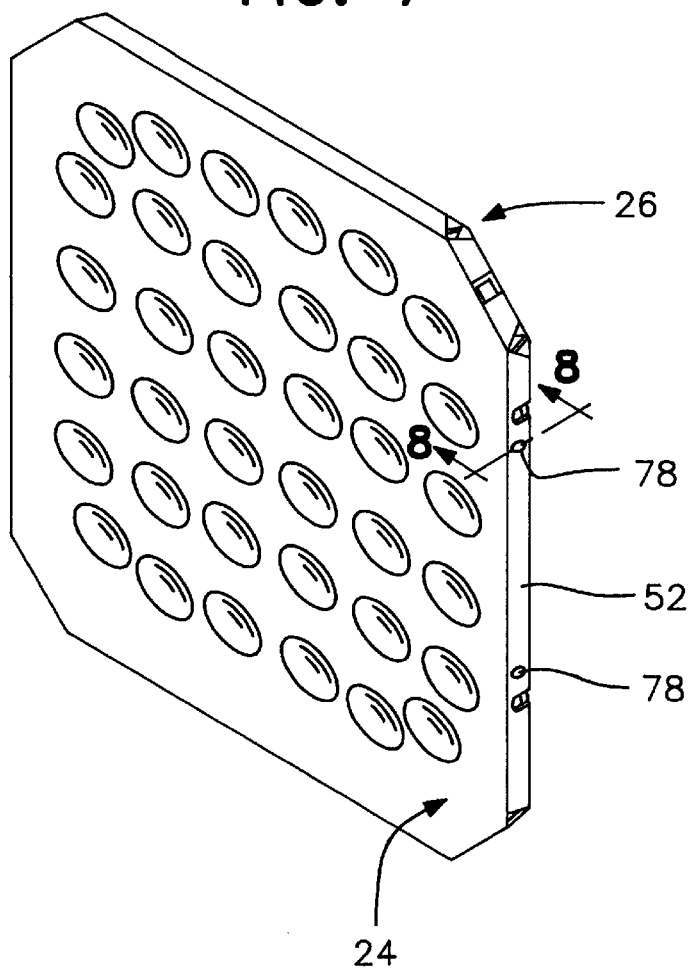
FIG. 7 is a perspective view of two interengaged screen sections.

Both screen sections 24, 26, have a plurality of holes 42 which are spaced over substantially the entire planar surface 44, 46 of screen sections 24, 26, respectively. This feature is shown in detail in FIG. 2 and is omitted from FIGS. 1 and 7, for illustrative purposes only. Holes 42 have a diameter of approximately 0.125 inches.

Spaced across the planar surface 44, 46 of screen sections 24, 26 are located a plurality of dimples 48, preferably 36 in number. The dimples 48 projecting from planar surface 44 of screen surface 24 project towards planar surface 46 of screen section 26. Similarly, dimples 50 of planar surface 46 of screen section 26 project towards the planar surface 44 of screen section 24.

Figure 8:
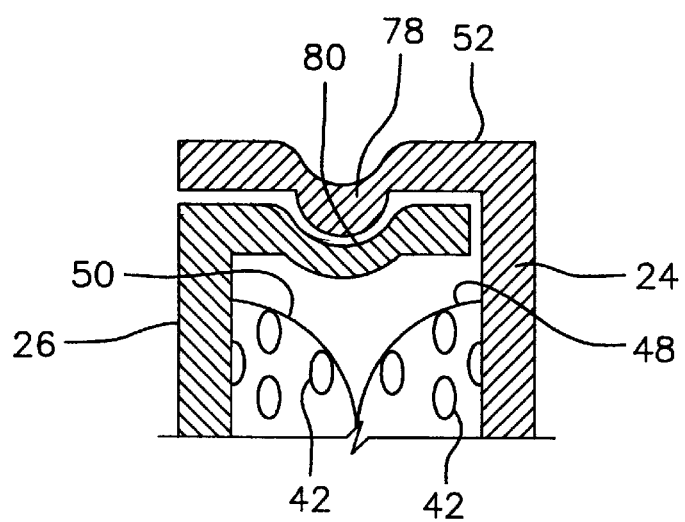
FIG. 8 is a sectional view taken along line 8—8 of FIG. 7.
Figure 9:
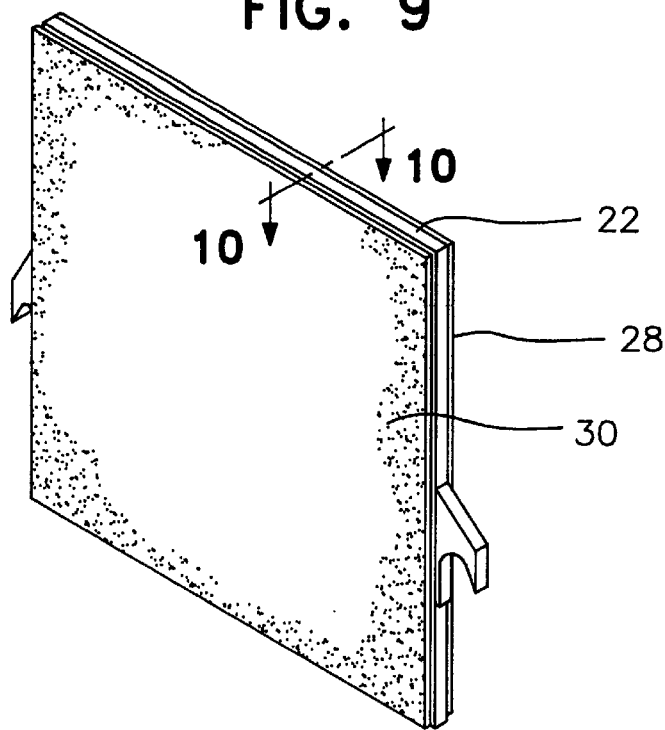
FIG. 9 is a perspective view of a filter plate assembly having two filter material sections located on opposite sides of the filter plate assembly.
Figure 10:
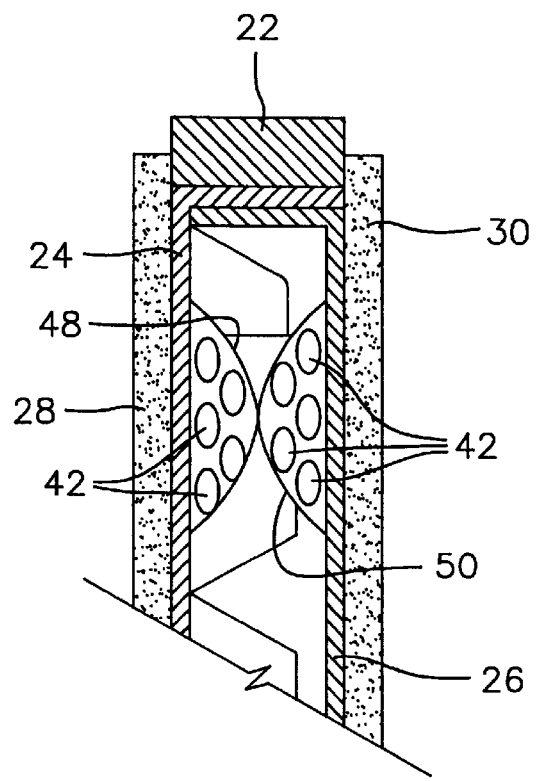
FIG. 10 is a sectional view taken along line 10—10 of FIG. 9.

It is understood that when the screen sections 24, 26 are interengaged, the dimples 48, 50 of the respective screens sections 24, 26 will contact each other at their respective apexes of curvature so as to form a support surface between the interengagement of all of the dimples 48 of screen section 24 correspondingly positioned against dimples 50 of the screen section 26. This is illustrated in FIGS. 8 and 10. In this manner, the screen sections 24, 26 can fit within the frame 22 and be self supporting against any tendency to bow inwardly as caused by the forces experienced during the compression of the plurality of filter plate assemblies in a horizontal type filter press.

With reference to FIGS. 3 through 6, the side edge portion 52 of screen section 24 is shown in FIG. 3 whereas side edge portion 54 of screen section 24 is shown in FIG. 4. In FIG. 3, side edge portion 52, includes two spaced grooves 56, extending from a free edge 58 of side edge portion 52 towards the planar surface 44 of the screen portion 24.

On opposite side edge portion 54 of screen section 24, there are two spaced holes 60 in the side edge portion 54, of equal spacing to the grooves 56 in the opposite side edge portion 52. The holes 60 are present in a preferred embodiment, however, it is understood as being within the scope of the present invention to include grooves similar to grooves 56 on side edge portion 52 instead of holes 60.

Referring to FIGS. 5 and 6, two side edge portions 62 and 64 of screen section 26 are shown, respectively. Side edge portions 62 and 64 include grooves 66, 68 respectively, with two on each side edge portion, located at the same spacing as grooves 56 on side edge portion 52 and holes 60 on side edge portion 54 of screen section 24.

In mounting the screen sections 24, 26 in the frame 22, the screen sections cooperate with retaining pins 70 located in side frame section 72 of frame 22 and retaining pin 74 in side frame section 76 of frame 22. In FIG. 1, only one retaining pin 74 is shown, it being understood that a second retaining pin 74 is located in side frame section 76 at an equal spacing as exists between retaining pins 70 on side frame portion 72.

Initially, the holes 60 in side edge portion 54 of screen section 24 are located around retaining pins 74. The opposite side edge portion 52 is then swung into place so that the retaining pins 70 are received in the grooves 56.

Thereafter, grooves 66 of side edge portion 62 of screen 26 are placed to engage around retaining pins 70 and similarly, grooves 68 of side edge portion 64 of screen section 26 are placed to engage retaining pins 74 on side frame section 76 of frame 22. The two screen sections are moved towards each other until the apex of their respective dimples 48, 50 contact one another to maintain the relative position of the screen sections 24, 26.

To retain the screen sections 24, 26 in place in the frame 22, four projections 78 extending inwardly, with two projections on side edge portion 52 and two projections on side edge portion 54 of screen portion 24, fit within corresponding recesses 80 in side edge portions 62, 64 of screen section 26. This is shown in greater detail in FIGS. 7 and 8. The interengagement of the four sets of projections and recesses 78, 80, holds the two screen section together while the grooves 56, 66, 68 and holes 60 retain the screen sections on retaining pins 70, 74.

Accordingly, the two screen sections snap together inside the frame 22 around the retaining pins to retain their position in the frame and to retain their position with respect to each other by engagement of the respective inwardly projecting dimples extending from the respective planar surfaces 44, 46. For cleaning of the screen sections and frame after a filter press operation, one screen section is forced away from the biased interengagement of the projections in the corresponding recess in the sides of the screen sections. Sterilization of the components of the filter plate assembly of the present invention may then be accomplished with all areas of the screen sections and frame, forming the filter plate assembly, being sterilized.

The foregoing description should be considered as illustrative only of the principles of the invention. Since numerous modifications and changes will readily occur to those skilled in the art, it is not desired to limit the invention to the exact construction and operation shown and described, and, accordingly, all suitable modifications and equivalents may be resorted to, falling within the scope of the invention.

We claim:

1. A filter plate assembly comprising:

a frame defining an opening and retaining pins projecting from a side wall of the frame into the opening, and two screen sections removably mounted in said opening of said frame, said screen sections being supported in position by said retaining pins, one of said screen sections including recesses and the other of said screen sections including projections, said two screen sections being interengaged by said recesses and said projections.

2. A filter plate assembly as claimed in claim 1, wherein each of said screen sections includes a plurality of dimples extending towards another screen section.

3. A filter plate assembly as claimed in claim 2, wherein said dimples of each of said screen sections contact each other when said two screen sections are mounted in said frame.

4. A filter plate assembly as claimed in claim 1, wherein side edge portions of said two screen sections cooperate with said retaining pins for supporting said two screen sections in position in said frame.

5. A filter plate assembly as claimed in claim 4, wherein said side edge portions include openings for cooperating with said retaining pins.

6. A filter plate assembly for a horizontal filter press, said filter plate assembly comprising:

a frame having four side portions surrounding an opening, two of said four side portions including retaining pins opposed to each other and extending into said opening, two screen sections removably mounted on said retaining pins to fit within said frame and in said opening with said two screen sections being removably interengaged with each other when in said frame, one of said screen sections including recesses and the other of said screen sections including projection, said two screen sections being interengaged by said recesses and said projections.

7. A filter plate assembly as claimed in claim 6, wherein each of said screen sections includes a plurality of dimples extending towards another screen section.

8. A filter plate assembly as claimed in claim 7, wherein said dimples of each of said screen sections contact each other when said two screen sections are mounted in said frame.

9. A filter plate assembly as claimed in claim 6, wherein side edge portions of said two screen sections cooperate with said retaining pins for supporting said two screen sections in position in said frame.

10. A filter plate as claimed in claim 9, wherein said side edge portions include openings for cooperating with said retaining pins.

11. A screen section for mounting in a frame of a horizontal filter press, said screen section comprising:

a centrally located planar surface, edge portions extending on sides of said planar surface, a plurality of portions of said planar surface extending away from said planar surface in a same direction as said edge portions extending from said planar surface, and an opening in said edge portions for cooperation with a retaining pin on the frame of the horizontal filter press;

said edge portions including one of a recess and a projection for interengaging and fitting with another screen section in an interengaged fashion in the frame of the horizontal filter press.

12. A screen section as claimed in claim 11, wherein said plurality of portions are semi-hemispherically shaped dimples.

13. A filter plate assembly comprising:

a frame defining an opening and retaining pins projecting from a side wall of the frame into the opening, two screen sections removably mounted in said opening of said frame, said screen sections being supported in position by said retaining pins, and a portion of a planar surface of each of said screen sections projects towards the other screen section and contacts each other intermediate said respective planar surfaces for maintaining a distance between said planar surfaces of said screen sections when said screen sections are mounted in said frame.

14. A filter plate assembly comprising:

a frame defining an opening and retaining pins projecting from a side wall of the frame into the opening, and two screen sections removably mounted in said opening of said frame, one of said screen sections fitting within the other of said screen sections, said screen sections being supported in position by said retaining pins.

15. A filter plate assembly for a horizontal filter press, said filter plate assembly comprising:

a frame having four side portions surrounding an opening, two of said four side portions including retaining pins opposed to each other and extending into said opening, two screen sections removably mounted on said retaining pins to fit within said frame and in said opening with said two screen sections being removably interengaged with each other when in said frame, a portion of a planar surface of each of said screen sections projects towards the other screen section and contacts each other intermediate said respective planar surfaces for maintaining a distance between said planar surfaces of said screen sections when said screen sections are mounted in said frame.

16. A filter plate assembly for a horizontal filter press, said filter plate assembly comprising:

a frame having four side portions surrounding an opening, two of said four side portions including retaining pins opposed to each other and extending into said opening, two screen sections removably mounted on said retaining pins to fit within said frame and in said opening with said two screen sections being removably interengaged with each other when in said frame, one of said screen sections fitting within the other of said screen sections.

17. A filter plate assembly comprising:

a frame defining an opening, and two screen sections removably mounted in said opening of said frame, a portion of a planar surface of each of said screen sections projects toward the other screen section and contacts each other intermediate said respective planar surfaces for maintaining a distance between said planar surfaces of said screen sections when said screen sections are mounted in said frame.

* * * * *